US012602929B2

(12) United States Patent
Xie et al.

(10) Patent No.: US 12,602,929 B2
(45) Date of Patent: Apr. 14, 2026

(54) SYSTEM, METHOD AND APPARATUS FOR DETECTING ARTICLE STORE OR RETRIEVE OPERATIONS

(71) Applicant: HANGZHOU HIKVISION DIGITAL TECHNOLOGY CO., LTD., Hangzhou (CN)

(72) Inventors: Songlin Xie, Hangzhou (CN); Qiang Ma, Hangzhou (CN); Zhenfeng Zhu, Hangzhou (CN); Jingxiong Wang, Hangzhou (CN); Hui Mao, Hangzhou (CN); Shiliang Pu, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 315 days.

(21) Appl. No.: 17/616,810

(22) PCT Filed: Jun. 4, 2020

(86) PCT No.: PCT/CN2020/094433
§ 371 (c)(1),
(2) Date: Dec. 6, 2021

(87) PCT Pub. No.: WO2020/244592
PCT Pub. Date: Dec. 10, 2020

(65) Prior Publication Data
US 2022/0309444 A1 Sep. 29, 2022

(30) Foreign Application Priority Data

Jun. 6, 2019 (CN) .......................... 201910492987.6

(51) Int. Cl.
*G06V 20/52* (2022.01)
*G06K 7/14* (2006.01)
(Continued)

(52) U.S. Cl.
CPC ........... *G06V 20/52* (2022.01); *G06K 7/1417* (2013.01); *G06K 7/1443* (2013.01);
(Continued)

(58) Field of Classification Search
CPC .... G06V 20/52; G06V 10/225; G06V 10/245; G06Q 10/087; G06Q 20/202;
(Continued)

(56) References Cited

U.S. PATENT DOCUMENTS 10,769,844 B1 * 9/2020 Rezvani .................. G06T 17/05
2007/0019842 A1 1/2007 Kang
(Continued)

FOREIGN PATENT DOCUMENTS

CN 101871768 A 10/2010
CN 104021570 A 9/2014
(Continued)

OTHER PUBLICATIONS

Matt Triff, Automatic Inventory Identification through Image Recognition, Saint Mary's University, Jul. 2017, Halifax, Nova Scotia, pp. 1-110 (Year: 2017).*
(Continued)

*Primary Examiner* — Aaron Tutor
(74) *Attorney, Agent, or Firm* — Knobbe, Martens, Olson & Bear, LLP

(57) ABSTRACT

Provided is a system for detecting article store or retrieve operations. The system for detecting store or retrieve operations includes: an article storage-retrieval cabinet, an image acquiring unit, and a storage or retrieval detecting unit, wherein an edge of an entrance-exit of the article storage-retrieval cabinet is provided with a marker, and the image acquiring unit is configured to acquire an image of the entrance-exit of the article storage-retrieval cabinet; and the storage or retrieval detecting unit is connected to the image (Continued)

(a)

(b)

(c)

acquiring unit, and is configured to detect an article store or retrieve operation based on marker information in the image acquired by the image acquiring unit.

18 Claims, 9 Drawing Sheets

(51) Int. Cl.
    *G06Q 10/087*     (2023.01)
    *G06V 10/22*     (2022.01)
    *G06V 10/24*     (2022.01)
(52) U.S. Cl.
    CPC ......... *G06Q 10/087* (2013.01); *G06V 10/225* (2022.01); *G06V 10/245* (2022.01)
(58) Field of Classification Search
    CPC .......... G06Q 20/40145; G06K 7/1417; G06K 7/1443; G07F 9/009; G07F 17/10
    See application file for complete search history.

(56) References Cited

U.S. PATENT DOCUMENTS

| | | | |
|---|---|---|---|
| 2011/0086221 A1* | 4/2011 | Pokorny | C09J 7/29 |
| | | | 73/150 R |
| 2012/0020531 A1 | 1/2012 | Owens, Jr. et al. | |
| 2016/0371855 A1* | 12/2016 | Jovanovic | G06T 7/90 |
| 2019/0197818 A1* | 6/2019 | Rosander | G07F 17/3209 |
| 2020/0093288 A1 | 3/2020 | Sun et al. | |
| 2022/0207479 A1* | 6/2022 | Reid | G06V 10/225 |

FOREIGN PATENT DOCUMENTS

| | | | |
|---|---|---|---|
| CN | 104394361 A | 3/2015 |
| CN | 104680555 A | 6/2015 |
| CN | 105184231 A | 12/2015 |
| CN | 106531161 A | 3/2017 |
| CN | 106934692 A | 7/2017 |
| CN | 107358150 A | 11/2017 |
| CN | 107403248 A | 11/2017 |
| CN | 107424359 A | 12/2017 |
| CN | 107507339 A | 12/2017 |
| CN | 107886734 A | 4/2018 |
| CN | 208027470 U | 10/2018 |
| CN | 108885813 A | 11/2018 |
| CN | 109330284 A | 2/2019 |
| CN | 109711337 A | 5/2019 |
| CN | 109712102 A | 5/2019 |
| CN | 109840504 A | 6/2019 |
| CN | 109840760 A | 6/2019 |
| WO | 2009027835 A2 | 3/2009 |

OTHER PUBLICATIONS

International search report of PCT application No. PCT/CN2020/094433 issued on Jul. 29, 2020.

First office action of Chinese application No. 201910492987.6 issued on Jul. 23, 2021.

Extended European search report of counterpart European application No. 20817655.2 issued on Jun. 23, 2022.

* cited by examiner

Acquiring a current image of an entrance-exit of the article store or retrieve cabinet — 601

Detecting marker information in the current image — 602

Detecting an article store or retrieve operation based on a detection result — 603

（a）

（b）

（c）

SYSTEM, METHOD AND APPARATUS FOR DETECTING ARTICLE STORE OR RETRIEVE OPERATIONS

CROSS-REFERENCE TO RELATED APPLICATION

This application is a US national stage of PCT international patent application No. PCT/CN2020/094433 filed on Jun. 4, 2020, which claims priority to the Chinese Patent Application No. 201910492987.6, filed on Jun. 6, 2019 and entitled "SYSTEM, METHOD AND APPARATUS FOR DETECTING ARTICLE STORE OR RETRIEVE OPERATIONS," the disclosures of which are herein incorporated by reference in their entireties.

TECHNICAL FIELD

Embodiments of the present disclosure relate to the field of image processing techniques, and in particular, to a system, method, and apparatus for detecting article store or retrieve operations.

BACKGROUND

With the development of Artificial Intelligence, article storage-retrieval cabinets have gradually been widely used. For example, the article storage-retrieval cabinet may be configured to store articles. When articles need to be stored and retrieved, the articles may be taken out of the article storage-retrieval cabinet or placed in the article storage-retrieval cabinet. Therefore, how to detect article store or retrieve operations is a critical issue.

SUMMARY

Embodiments of the present disclosure provide a system, method, and apparatus for detecting article store or retrieve operations, which can solve the problems in related art.

In one aspect, the embodiments of the present disclosure provide a system for detecting article store or retrieve operations. The system includes: an article storage-retrieval cabinet, an image acquiring unit, and a storage or retrieval detecting unit; wherein an edge of an or an exit of the article storage-retrieval cabinet is provided with a marker, and the image acquiring unit is configured to acquire an image of the entrance-exit of the article storage-retrieval cabinet; and the storage or retrieval detecting unit is connected to the image acquiring unit, and is configured to detect an article store or retrieve operation based on marker information in the image acquired by the image acquiring unit.

In some embodiments, the marker includes one or more of a line feature marker, a barcode marker, and a checkerboard marker.

In some embodiments, a plurality of markers are provided, wherein the plurality of markers form a feature array, and an interval between every two markers is less than that a width of the smallest article of articles retrieved from or stored into the article storage-retrieval cabinet.

In some embodiments, the image acquiring unit includes a camera, wherein a monitoring area of the camera covers the entire entrance-exit of the article storage-retrieval cabinet.

In some embodiments, the image acquiring unit includes a plurality of cameras, wherein a monitoring area of each of the plurality of cameras covers a part of the entrance-exit of the article storage-retrieval cabinet, and the monitoring areas of the plurality of cameras cover the entire entrance-exit of the article storage-retrieval cabinet.

In some embodiments, the system further includes a light source for supplementing light to the marker.

In some embodiments, one side of the edge of the marker is made of a light-absorbing material, and the other side is made of a diffuse reflection material.

In some embodiments, a difference between pixel values or pixel gray values of areas on both sides of the edge of the marker in the image acquired by the image acquiring unit is greater than 10.

In another aspect, the embodiments of the present disclosure further provide a method for detecting article store or retrieve operations. The method is applicable to any of the above systems, and includes:

acquiring a current image of an entrance-exit of the article storage-retrieval cabinet;

detecting marker information in the current image; and detecting an article store or retrieve operation based on a detection result.

In some embodiments, detecting the article store or retrieve operation based on the detection result includes:

in response to the detection result indicating that the marker information is detected, matching the detected marker information with reference marker information, the reference marker information including marker information in the case that the marker at the edge of the entrance-exit of the article storage-retrieval cabinet is not blocked; and detecting the article store or retrieve operation based on a matching result.

In some embodiments, the marker information is configured to indicate a location and feature of the marker; and detecting the article store or retrieve operation based on the matching result includes:

in response to the location and feature of the marker indicated by the detected marker information matching the location and feature of the marker indicated by the reference marker information respectively, determining that article store or retrieve operation has not been performed; or in response to the location and feature of the marker indicated by the detected marker information not matching the location and feature of the marker indicated by the reference marker information respectively, determining that the article store or retrieve operation has been performed.

In some embodiments, detecting the article store or retrieve operations based on the detection result includes:

in response to the detection result indicating that no marker information is detected, determining that an article store or retrieve operation has been performed.

In some embodiments, in response to determining that the article store or retrieve operation has been performed, the method further includes:

determining an area where the marker is blocked, and outputting a store or retrieve signal based on a change in the area where the marker is blocked, the store or retrieve signal being configured to indicate a state of the article store or retrieve operation.

In another aspect, the embodiments of the present disclosure further provide an apparatus for detecting article store or retrieve operations. The apparatus is applicable to any of the above systems, and includes:

an acquiring module, configured to acquire a current image of an entrance-exit of the article storage-retrieval cabinet;

a first detecting module, configured to detect marker information in the current image; and a second detecting module, configured to detect an article store or retrieve operation based on a detection result.

In some embodiments, the second detecting module is configured to match, in response to the detection result indicating that the marker information is detected, the detected marker information with reference marker information, the reference marker information including marker information in the case that the marker at the edge of the entrance-exit of the article storage-retrieval cabinet is not blocked; and detect the article store or retrieve operation based on a matching result.

In some embodiments, the marker information is configured to indicate a location and feature of the marker;

the second detecting module is configured to determine, in response to the location and feature of the marker indicated by the detected marker information matching the location and feature of the marker indicated by the reference marker information respectively, that the article store or retrieve operation has not been performed; and in response to the location and feature of the marker indicated by the detected marker information not matching the location and feature of the marker indicated by the reference marker information respectively, determine that the article store or retrieve operation has been performed.

In some embodiments, the second detecting module is configured to determine, in response to the detection result indicating that no marker information is detected, that the article store or retrieve operation has been performed.

In some embodiments, the apparatus further includes:

an output module, configured to, in response to determining that the article store or retrieve operation has been performed, determine an area where the marker is blocked, and output a store or retrieve signal based on a change in the area where the marker is blocked, the store or retrieve signal being configured to indicate a state of the article store or retrieve operation.

In another aspect, the embodiments of the present disclosure further provide a computer device. The computer device includes a processor and a memory. At least one instruction is stored in the memory. The at least one instruction, when executed by the processor, causes the processor to perform any one of the above methods for detecting article store or retrieve operations.

In another aspect, the embodiments of the present disclosure further provide a computer-readable storage medium. At least one instruction is stored in the computer-readable storage medium. The at least one instruction, when executed, performs any one of the above methods for detecting an article store or retrieve operation.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

In order to make the objects, technical solutions, and advantages of the present disclosure clearer, the following further describes the embodiments of the present disclosure in detail with reference to the accompanying drawings.

In the related art, user action gestures are recognized with a deep learning network or target article tracking is realized by detecting target articles frame by frame, thereby achieving the purpose of detecting article store or retrieve operations.

However, such a method uses the deep learning network for video data analysis, which requires a large amount of calculation. Moreover, computing resources are often deployed on cloud servers and the amount of video transmission data is large, resulting in low detection efficiency, and it imposes high transmission bandwidth requirements, causing high deployment costs.

Figure 1:
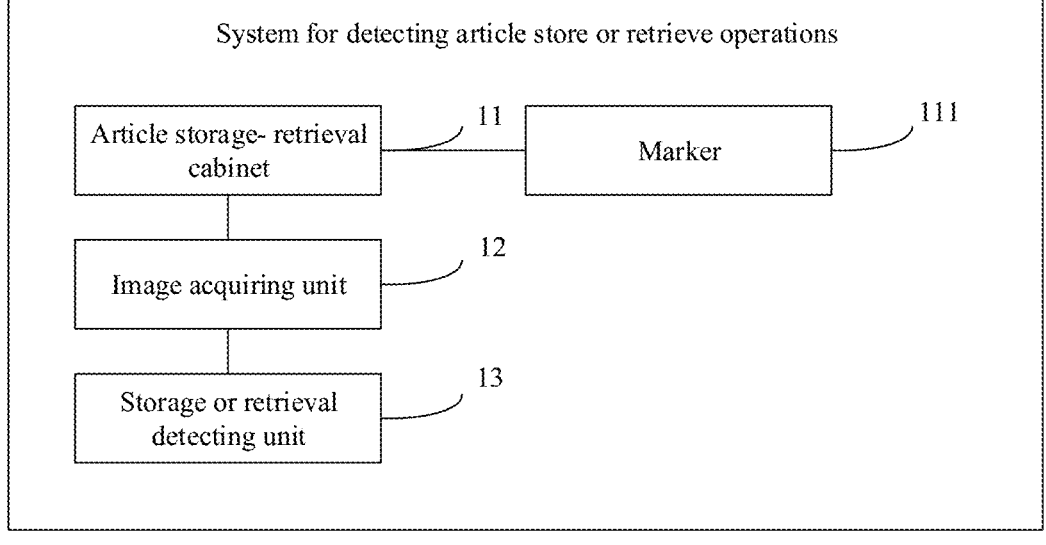
FIG. 1 is a schematic structural diagram of a system for detecting article store or retrieve operations according to an embodiment of the present disclosure.

An embodiment of the present disclosure provides a system for detecting article store or retrieve operations. As shown in FIG. 1, the system includes an article storage-retrieval cabinet 11, an image acquiring unit 12, and a storage and retrieval detecting unit 13.

An edge of an entrance-exit of the article storage-retrieval cabinet 11 is provided with a marker 111. The image acquiring unit 12 is configured to acquire an image of the entrance-exit of the article storage-retrieval cabinet 11.

The storage and retrieval detecting unit 13 is connected to the image acquiring unit 12, and is configured to detect an article store or retrieve operation based on marker information in the image acquired by the image acquiring unit 12.

The article storage-retrieval cabinet 11 is configured to store articles. The embodiment of the present disclosure does not limit the product form of the article storage-retrieval cabinet 11, nor does it limit the type, size, and quantity of the articles stored in the article storage-retrieval cabinet 11. Since when articles are retrieved from or stored into the article storage-retrieval cabinet 11, part of the area of the entrance-exit of the article storage-retrieval cabinet 11 is blocked, in the embodiment of the present disclosure, a marker 111 is provided on the edge of the entrance-exit of the article storage-retrieval cabinet 11, and whether an article store or retrieve operation has been performed can be detected based on the blocking of the marker 111.

In addition, the storage and retrieval detecting unit 13 may be connected to the image acquiring unit 12 for remote communication via a network. That is, the storage and retrieval detecting unit 13 may not be arranged in the same area as the image acquiring unit 12, the article storage-retrieval cabinet 11, or the like, that is, realizing detecting remote store or retrieve operations. Optionally, the storage and retrieval detecting unit 13 may serve a plurality of system for detecting article store or retrieve operations simultaneously, that is, one storage and retrieval detecting unit 13 may communicate with the image acquiring units in the plurality of system for detecting article store or retrieve operations simultaneously, so as to perform store or retrieve detection on different systems for detecting article store or retrieve operations based on the images acquired by the image acquiring units in the different systems for detecting article store or retrieve operations. The storage and retrieval detecting unit 13 may be implemented by a computer device. For example, a server is used as the storage and retrieval detecting unit 13, and the server may be deployed in the cloud.

Optionally, the marker 111 includes, but is not limited to, one or more of a line feature marker, a barcode marker, and a checkerboard marker.

Figure 2:
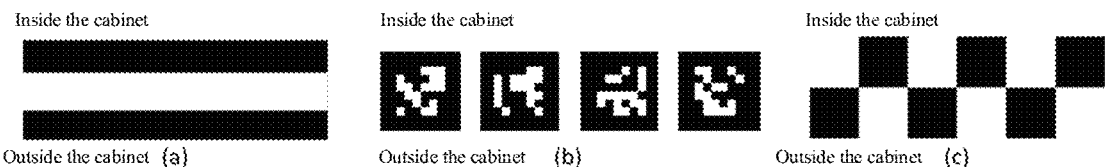
FIG. 2 is a schematic diagram of a marker according to an embodiment of the present disclosure.

In an optional embodiment of the present disclosure, a plurality of line features are encoded to form a line feature marker. For example, the line feature marker is of a vertical gradient encoding type, which is gradient-encoded in a direction perpendicular to a store and retrieve boundary (i.e., the edge of the entrance-exit). For the line feature marker as shown in FIG. 2(*a*), the gradient exists in the direction perpendicular to the boundary, and the marker interval of this encoding method is infinitely small. For example, the line feature marker may be a black and white stripe marker.

Bar codes and checkerboards may be encoded as two-dimensional (2D) encoding type markers, which are encoded in both directions perpendicular and parallel to the store and retrieve boundary. Common 2D encoding types include 2D codes and 2D encoding types in the form of checkerboards, such as the barcode in the form of 2D codes as shown in FIG. 2(*b*), and the checkerboard as shown in FIG. 2(*c*).

Regardless of the type of the marker 111, in the system according to the embodiment of the present disclosure, a plurality of markers 111 are provided, and the plurality of markers 111 form a feature array. In addition, an interval between every two markers 111 is smaller than a width of the smallest article of articles retrieved from or stored into the article storage-retrieval cabinet 11. For example, the markers 111 may be arranged continuously for a circle on the edge of the entrance-exit of the article storage-retrieval cabinet 11, and an interval between every two markers 111 is smaller than a width of the smallest article of the articles retrieved from or stored into the article storage-retrieval cabinet 11, thereby avoiding missing detection and further improving the accuracy of store and retrieve detection.

In an optional embodiment of the present disclosure, on the basis of providing the marker 111, the edge gradient of the marker 111 is guaranteed to be above 10, that is, a difference between pixel values (or pixel gray values) in areas on both sides of the edge of the marker 11 is greater than 10, so as to ensure the accuracy of feature extraction of the marker 111. In order to ensure that the marker 111 has a significant edge gradient, optionally, one side of the edge of the marker 111 is made of a light-absorbing material, and the other side of the edge of the marker 111 is made of a diffuse reflection material. That is to say, the materials on both sides of the edge of the marker 111 are often selected from materials with strong light absorption performance on one side, such as light-absorbing photographic cloth, printing ink, rubber, etc., and materials with strong diffuse reflection performance on the other side, such as printing paper, polyethylene terephthalate (PET) diffuse reflection materials, etc. The embodiment of the present disclosure does not limit the material of the marker 111, as long as the feature can be extracted.

For example, the marker 111 is in black and white, and a paper marker 111 printed in black and white may be posted on the edge of the entrance-exit of the article storage-retrieval cabinet 11. For example, a circle of area that may be configured to post the marker 111 exists around an inner cavity of the cabinet. The graphite in the black part of the marker 111 has good light absorption performance, while the printing paper in the white part has good diffuse reflection performance, ensuring that a grayscale difference between black and white in the grayscale image of the marker 111 is more than 10, for example, 100.

Optionally, the image acquiring unit 12 is configured to acquire the image of the entrance-exit of the article storage-retrieval cabinet 11. The image acquiring unit 12 may include one camera whose monitoring area covers the entire entrance-exit of the article storage-retrieval cabinet 11. Therefore, the entire entrance-exit of the article storage-retrieval cabinet 11 may be photographed by the camera, avoiding inaccurate store and retrieve detection due to missing detection of a certain marker 111. For example, a circle of markers 111 are continuously arranged on the inner cavity at the edge of the entrance-exit of the article storage-retrieval cabinet 11, and the detection camera may acquire the features of the marker 111 while monitoring the entrance-exit. The camera's angle of view may cover the entire entrance-exit, ensuring that the store or retrieve operation at any location can be demonstrated by the acquired image, thereby avoiding missing detection.

Figure 3:
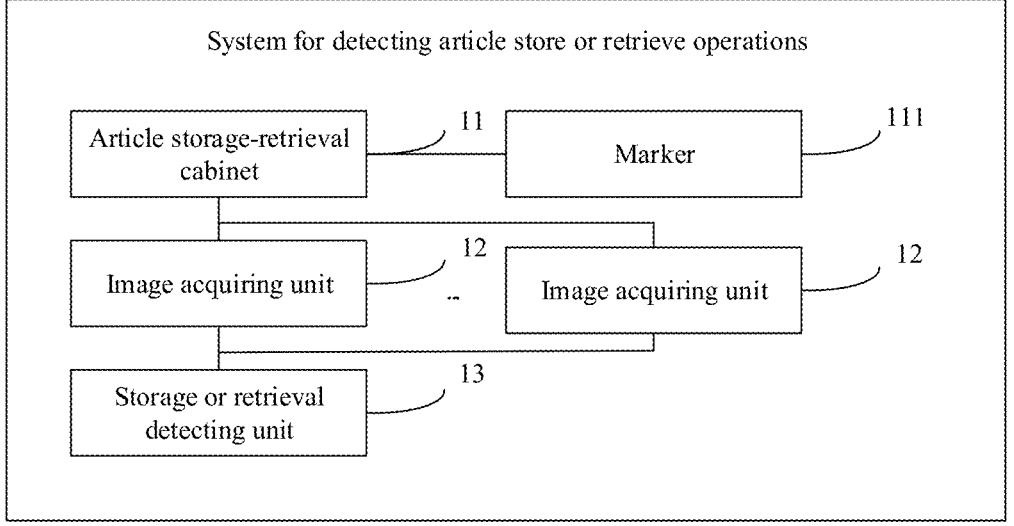
FIG. 3 is a schematic structural diagram of a system for detecting article store or retrieve operations according to an embodiment of the present disclosure.

Optionally, in addition to using one camera, referring to FIG. 3, the image acquiring unit 12 includes a plurality of cameras. A monitoring area of each of the plurality of cameras covers a part of the entrance-exit of the article storage-retrieval cabinet 11. The monitoring areas of the plurality of cameras cover the entire entrance of the article storage-retrieval cabinet 11. For example, the number of the cameras is determined according to the size of the entrance-exit of the article storage-retrieval cabinet 11 and the viewing angle range of the camera to ensure that a sum of the monitoring areas of the cameras used for detection can cover the entire entrance-exit of the article storage-retrieval cabinet 11.

It should be noted that in the case that the image acquiring unit 12 in the system for detecting article store or retrieve operations includes a plurality of cameras, each camera transmits the current image as acquired to the storage and retrieval detecting unit 13. In addition, each camera needs to acquire the image synchronously, such that the current images acquired by the storage and retrieval detecting unit 13 are images at the same time, and the current images can reflect the situation of the entrance-exit of the article storage-retrieval cabinet 11 at the same time, so as to improve the accuracy of the detection results.

In addition, whether in FIG. 1 or FIG. 3, the embodiment of the present disclosure only takes the image acquiring unit 12 being connected to the article storage-retrieval cabinet 11 as an example for description. The image acquiring unit 12 may be provided within a certain range of the entrance-exit of the article storage-retrieval cabinet 11, so as to be able to acquire the image of the entrance-exit. Optionally, the image acquiring unit 12 may also be arranged separately from the article storage-retrieval cabinet 11. For example, the image acquiring unit 12 is arranged opposite to the article storage-retrieval cabinet 11, and is directly opposite to the entrance-exit of the article storage-retrieval cabinet 11, as long as it can acquire the image of the entrance-exit. The embodiment of the present disclosure does not limit the specific number and location of the image acquiring unit 12.

Figure 4:
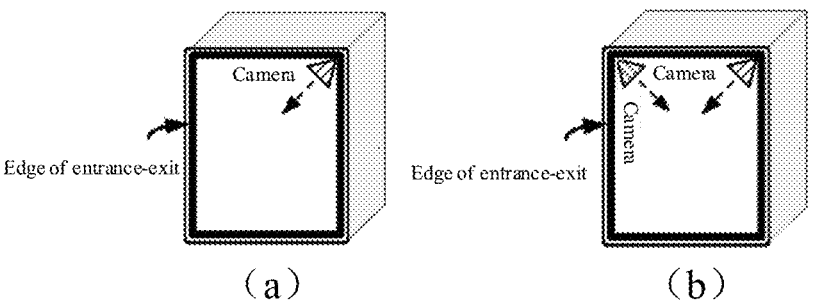
FIG. 4 is a schematic structural diagram of a system for detecting article store or retrieve operations according to an embodiment of the present disclosure.

For ease of understanding, the present disclosure takes the schematic diagram shown in FIG. 4 as an example. As shown in FIG. 4(*a*), the image acquiring unit 12 includes one camera, and a marker may be provided at the edge of the entrance-exit of the article storage-retrieval cabinet 11. One camera may be provided at an upper right corner of the entrance-exit to detect the entrance-exit and acquire the image of the entire entrance-exit. As shown in FIG. 4(*b*), one camera may also be provided at the upper right corner and an upper left corner of the entrance-exit respectively to detect the entire and acquire the image of the entire entrance-exit.

Figure 5:
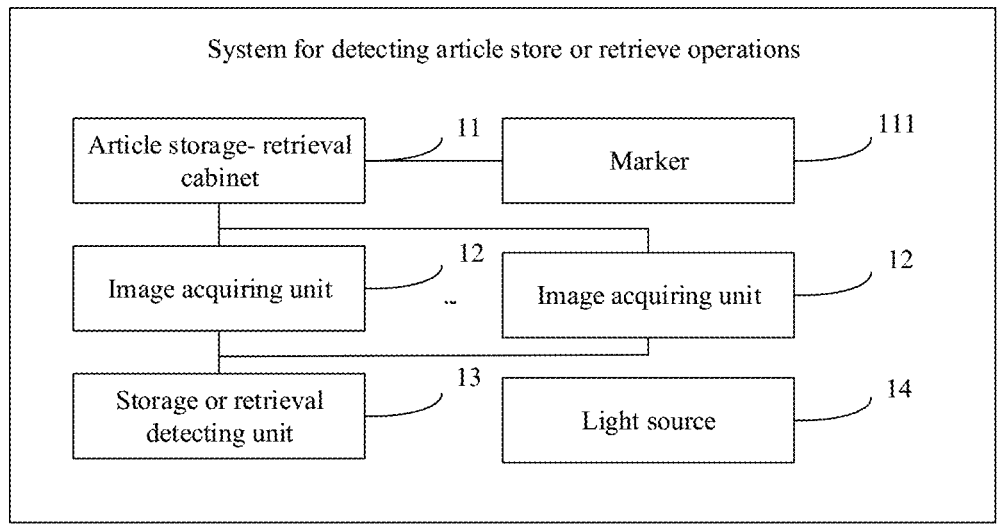
FIG. 5 is a schematic structural diagram of a system for detecting article store or retrieve operations according to an embodiment of the present disclosure.

Optionally, considering that the light changes in the environment where the article storage-retrieval cabinet 11 is located may affect the clarity of the image acquired by the image acquiring unit 12, and affect the recognition of the marker. In this regard, the system further includes a light source 14 for supplementing light to the marker 111, as shown in FIG. 5. The marker 111 is supplemented with light by the light source 14, so as to ensure that the grayscale of the feature image of the marker 111 does not change with the changes in the light conditions of the external environment, thereby ensuring the accuracy of store and retrieve detection.

The location of the light source 14 is not limited in the embodiment of the present disclosure, as long as the marker 111 can be supplemented with light. For example, the light source 14 may be arranged directly opposite to the article storage-retrieval cabinet 11 to face the edge of the entrance-exit of the article storage-retrieval cabinet 11. In addition, the number of the light sources 14 may be one or more. The embodiment of the present disclosure does not limit the number of the light sources 14 and the type of the light source 14. Optionally, the system may further include a control device configured to control the light source 14 to be turned on and off. For example, the control device may control the turning on and off of the light source 14 based on the brightness of the environment where the article storage-retrieval cabinet 11 is located.

Figure 6:
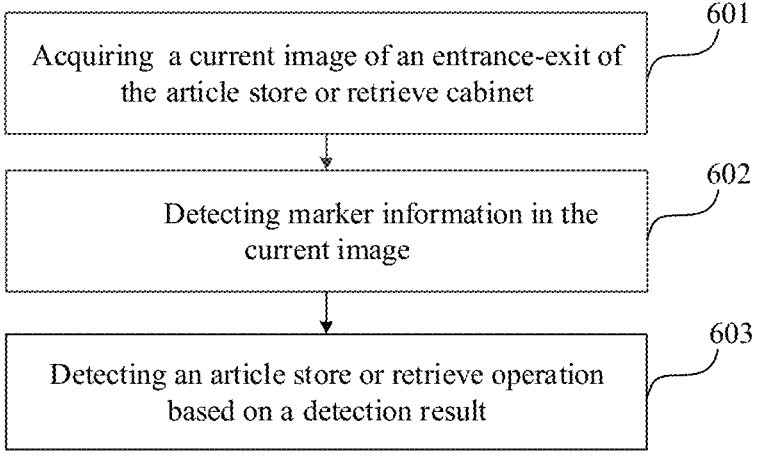
FIG. 6 is a flowchart of a method for detecting article store or retrieve operations according to an embodiment of the present disclosure.

Based on the above system for detecting article store or retrieve operations, in the case that an article store or retrieve operation is performed, an article entering the article storage-retrieval cabinet to perform the store or retrieve operation blocks the marker 111, and the store or retrieve operation can be accurately detected by detecting the blocking of the marker 111. In this regard, referring to FIG. 6, an embodiment of the present disclosure provides a method for detecting article store or retrieve operations, which is applicable to the storage and retrieval detecting unit 13 in the above system for detecting article store or retrieve operations. As shown in FIG. 6, the method includes the following steps.

In step 601, a current image of an entrance-exit of an article storage-retrieval cabinet is acquired.

For example, based on the above system for detecting article store or retrieve operations, the current image of the entrance-exit of the article storage-retrieval cabinet 11 is acquired by the image acquiring unit 12. The image acquiring unit 12 transmits the current image as acquired to the storage and retrieval detecting unit 13.

It should be noted that in the case that the image acquiring unit 12 in the system for detecting article store or retrieve operations includes a plurality of cameras, each camera transmits the current image as acquired to the storage and retrieval detecting unit 13. In addition, each camera needs to acquire the image synchronously, such that the current images acquired by the storage and retrieval detecting unit 13 are images at the same time, and the current images can reflect the situation of the entrance-exit of the article storage-retrieval cabinet 11 at the same time, so as to improve the accuracy of the detection results.

In step 602, marker information in the current image is detected.

Upon acquiring the current image of the entrance-exit of the article storage-retrieval cabinet 11, the storage and retrieval detecting unit 13 detects the marker information in the current image. Optionally, the marker information is configured to indicate a location and feature of the marker 111, and the feature may be a feature of the location where the marker 111 is located. Optionally, before the marker information in the current image is detected, marker information when the marker 111 on the edge of the entrance-exit of the article storage-retrieval cabinet 11 is not blocked may be acquired first.

For example, the system for detecting article store or retrieve operations needs to be initialized once, using a reference image provided by the image acquiring unit 12 without any store or retrieve operation to detect the location and the corresponding feature of the marker 111 therein. For example, for the line feature marker as shown in FIG. 2(*a*), the marker feature is acquired by extracting the location and direction of the gradient in the reference image. For the 2D code-encoded marker as shown in FIG. 2(*b*), the 2D code is recognized by a 2D code recognition algorithm and the location and internal encoding of the 2D code are acquired. For the checkerboard marker as shown in FIG. 2(*c*), the location of a checkerboard corner is acquired by a checkerboard corner extraction algorithm, and the locations and features of all markers in the reference image are obtained.

Similarly, the above method of detecting the marker information in the reference image may be applied to detecting the marker information in the current image, which is not repeated herein.

In step 603, an article store or retrieve operation is detected based on a detection result.

Optionally, detecting the article store or retrieve operation based on the detection result includes: in response to the detection result indicating that the marker information is detected, matching the detected marker information with reference marker information, the reference marker information including marker information in the case that the marker at the edge of the entrance-exit of the article storage-retrieval cabinet is not blocked; and detecting the article store or retrieve operation based on a matching result.

Since the marker is not blocked in the case that no store or retrieve operation occurs, and the reference marker information includes the marker information in the case that the marker at the edge of the entrance-exit of the article storage-retrieval cabinet is not blocked, when the marker information is detected, the detected marker information may be matched with the reference marker information, so as to determine whether the marker is blocked based on the matching result, and then determine whether a store or retrieve operation has occurred.

Optionally, detecting an article store or retrieve operation based on the matching result includes, but is not limited to, the following two situations.

In a first situation: in the case that the location and feature of the marker indicated by the detected marker information match the location and feature of the marker indicated by the reference marker information respectively, it is determined that the article store or retrieve operation has not been performed.

In this situation, because the location and feature of the marker indicated by the marker information detected in the current image match the location and feature of the marker indicated by the reference marker information respectively, it means that the marker is not blocked, and thus it can be determined that the article store or retrieve operation has not been performed.

In a second situation: in the case that the location and feature of the marker indicated by the detected marker information do not match the location and feature of the marker indicated by the reference marker information respectively, then it is determined that the article store or retrieve operation has been performed.

It should be noted that in the above matching process, the marker features at the same location are matched, and in the case that a complete match exists or the matching degree reaches a matching degree threshold, it is determined that the two match each other, otherwise it is confirmed that the two do not match each other. The matching degree threshold may be defined based on the scene, or may be set based on experience, and may also be adjusted appropriately during application, which is not limited in the embodiment of the present disclosure.

Optionally, the above description is based on the situation where the detection result is that the marker information is detected. However, in some circumstances, the marker 111 may be completely blocked during the store or retrieve operation, and thus no marker information is detected from the current image. In this regard, optionally, detecting the an article store or retrieve operation based on the detection result includes: in response to the detection result indicating that no marker information is detected, determining that an article store or retrieve operation has been performed.

Where it is determined that the article store or retrieve operation has been performed, in order to be able to monitor the store or retrieve operation in real time, the method according to the embodiment of the present disclosure further includes: determining an area where the marker is blocked, and outputting a store or retrieve signal based on changes in the area where the marker is blocked, wherein the store or retrieve signal is configured to indicate a state of the article store or retrieve operation.

Optionally, in the process of determining the area where the marker 111 is blocked, in the case that no marker information is detected, it is considered that the marker 111 is completely blocked. Therefore, the entire area of the marker 111 may be regarded as a blocked area. In the case that the marker information is detected, since the marker information is configured to indicate the location of the marker 111, the marker information in the current image may be compared with reference marker information to determine which markers 111 are not matched. The area of the marker 111 that is not matched may be regarded as a blocked area. Since the image acquiring unit 12 may acquire the current image of the entrance-exit of the article storage-retrieval cabinet 11 anytime, whether the marker 111 is blocked and the area where the marker 111 is blocked may be determined from each current image. Therefore, the changes in the area where the marker 111 is blocked may be derived by comparing images at different moments with each other. The store or retrieve signal is output based on the changes in the blocked area of the marker 111, and the store or retrieve signal is configured to indicate the state of the article store or retrieve operation.

For example, based on the information of the area as determined where the marker is blocked, the store or retrieve signal is output by comparing changes in the number of blocked areas in previous and subsequent frame images in a time domain. The store or retrieve signal is configured to indicate the state of the article store or retrieve operation. For example, the store or retrieve signal includes an entry signal and an exit signal. When the number of blocked areas changes from n to n+1 (n=0, 1, 2, . . . ), the entry signal may be triggered. The entry signal is configured to indicate to enter the article storage-retrieval cabinet to detect the store or retrieve operation. When the number of blocked areas changes from n+1 to n (n=0, 1, 2, . . . ), the exit signal may be triggered. The exit signal is configured to indicate to exit the article storage-retrieval cabinet, but the store or retrieve operation has not ended yet.

Further, the store or retrieve signal may further include start and end state signals of the entire store and retrieve process obtained by analyzing the number of blocked areas. For example, when the number of blocked areas changes from 0 to 1, the start signal is triggered. The start signal is configured to indicate the start of entering the article storage-retrieval cabinet to detect the store or retrieve operation. When the number of blocked areas changes from 1 to 0, the end signal is triggered. The end signal is configured to indicate to completely exit the article storage-retrieval cabinet to complete the store or retrieve operation.

Next, the above method for detecting an article store or retrieve operation is illustrated by taking several different coding types of markers as examples.

Figure 7:
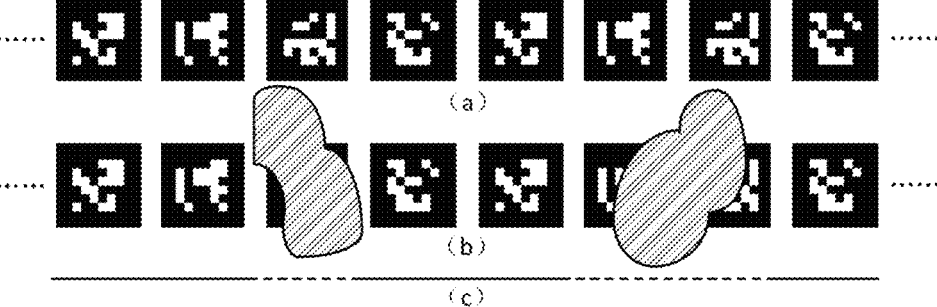
FIG. 7 is a schematic diagram of a process for detecting article store or retrieve operations according to an embodiment of the present disclosure.

First, the 2D code-encoded marker as shown in FIG. 7(*a*) is taken as an example for description. The 2D code-encoded marker is black and white, and a paper 2D code printed in black and white is posted on the edge of the entrance-exit of the article storage-retrieval cabinet. A light source may supplement light to the marker to reduce the change in illumination, thereby reducing the impact on the feature extraction of the 2D code. The graphite in the black part of the 2D code has good light absorption performance, and the printing paper of the white part has good diffuse reflection performance, ensuring that a grayscale difference between black and white in the 2D code is higher than 100 in a grayscale image.

Before detecting the store or retrieve operation, in the method according to the embodiment of the present disclosure, the image acquiring unit 12 first acquires a reference image at the moment when store or retrieve operation is not performed, and then the storage and retrieval detecting unit 13 recognizes all the 2D codes in the image. As shown in FIG. 7(*a*), for the continuous 2D code sequence located at the edge of the entrance-exit of the article storage-retrieval cabinet 11, the locations and the internal encoding vectors of all the 2D codes are obtained as the feature of the marker during store and retrieve detection, and the reference marker information is obtained for subsequent detection.

Figure 8:
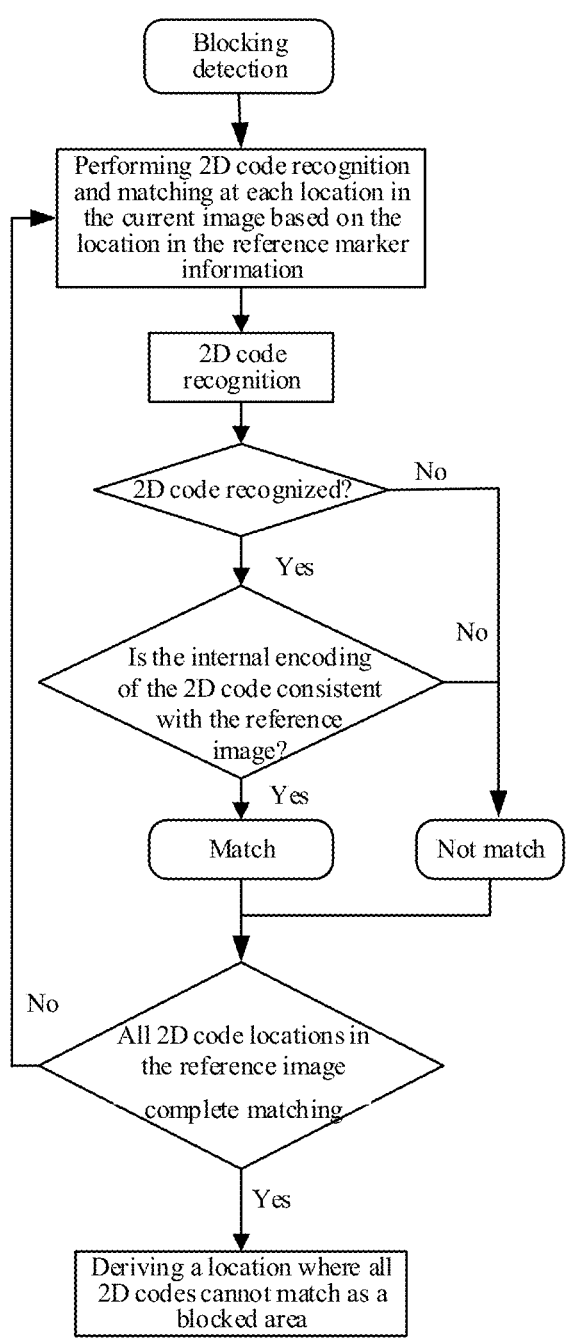
FIG. 8 is a flowchart of a method for detecting article store or retrieve operations according to an embodiment of the present disclosure.

Afterwards, the image acquiring unit 12 detects the current image of the entrance-exit of the article storage-retrieval cabinet 11 in real time. During the process of detecting the article store or retrieve operation, reference may be made to FIG. 8, and blocking detection is performed on the current image acquired by the image acquiring unit 12. In the case that the store or retrieve operation has been performed, the store or retrieve operation blocks the 2D code at the edge of the entrance-exit, and the blocked 2D code is shown in the shaded area in FIG. 7(*b*). The 2D code is detected on the current image according to the location of the 2D code derived from the reference marker information and the internal encoding vector of the 2D code is extracted. In the case that the 2D code is not detected in the current image or the internal encoding vector of the 2D code cannot match the internal encoding vector of the reference 2D code at the location, the 2D code at that location is blocked, and it is determined that the store or retrieve operation has been performed.

Figure 9:
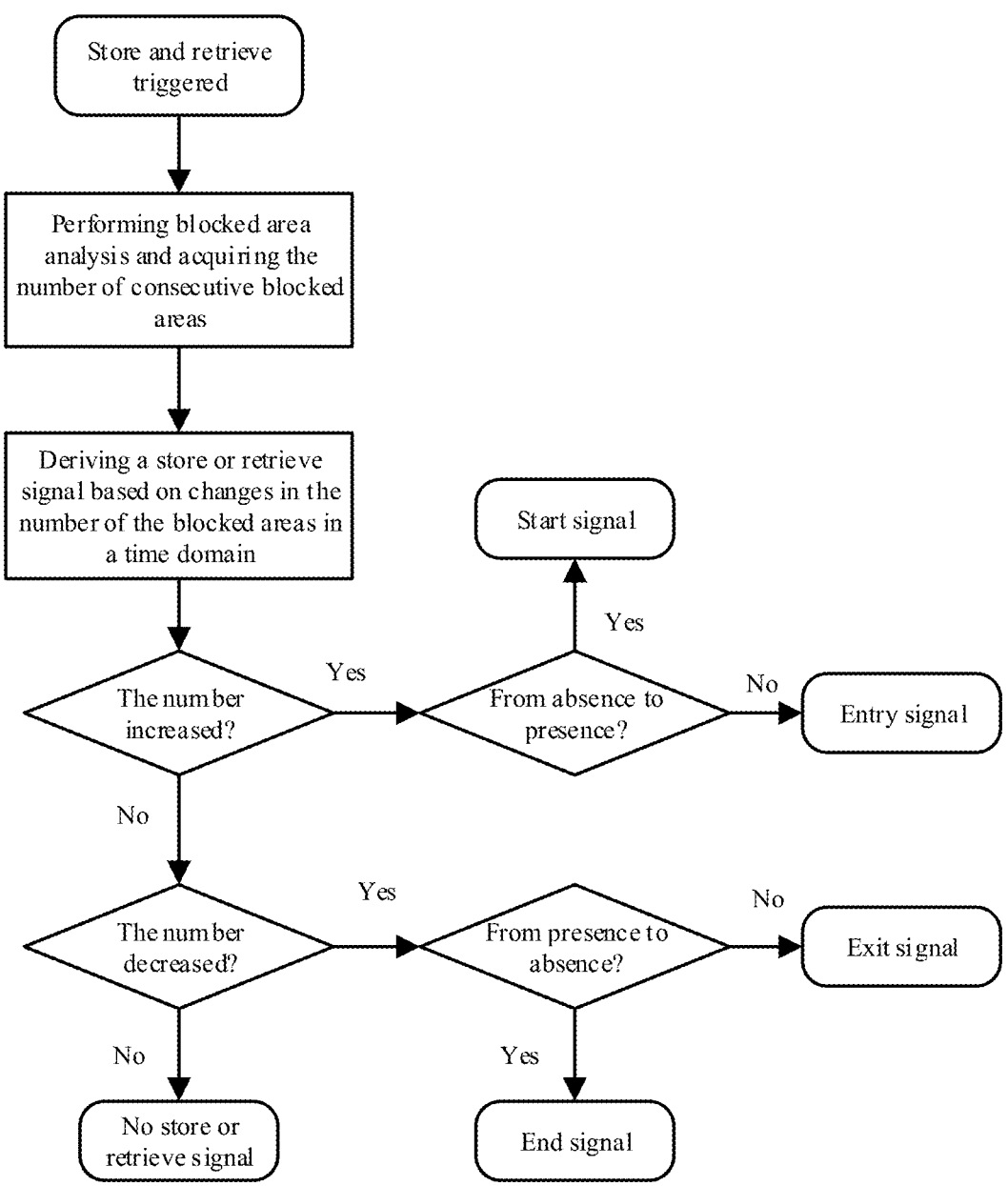
FIG. 9 is a schematic diagram of an output process of a store or retrieve signal according to an embodiment of the present disclosure.

Further, in the case that the store or retrieve operation has been performed, for the process of determining different store or retrieve signals, reference may be made to FIG. 9. Where each 2D code is recognized in this way, store and retrieve is triggered, and the blocked area is analyzed to obtain the location and number of blocked areas, as shown in FIG. 7(*c*). The dotted line portion is the blocked area where the store or retrieve operation has been performed. Two blocked areas are shown in FIG. 7. Using the information of the blocked area, a store or retrieve signal is output by comparing changes in the number of blocked areas of previous and subsequent frames in a time domain. That is, the store or retrieve signal is output by comparing changes in the number of blocked areas derived from the marker information in the current images acquired at different moments. For example, where the number of blocked areas increases in the time domain, in the case that it is from absence to presence, it is a start signal. Where the number of blocked areas increases in the time domain, in the case that it is not from absence to presence, it is an entry signal. Where the number of blocked areas in the time domain is reduced, in the case that it is from presence to absence, it is an end signal. Where the number of blocked areas in the time domain is reduced, in the case that it is not from presence to absence, it is an exit signal. For the content of the store or retrieve signal, reference may be made to the description following step 603, which is not repeated herein.

Figure 10:
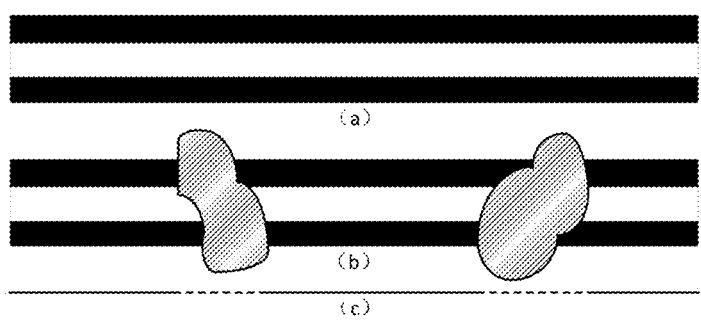
FIG. 10 is a schematic diagram of a process for detecting article store or retrieve operations according to an embodiment of the present disclosure.

Next, the method according to the embodiment of the present disclosure being applied to the marker with line features as shown in FIG. 10(*a*) is taken as an example. The method for detecting article storage and retrieval based on this marker is different from the processes shown in FIGS. 7 and 8 in the encoding type of the marker. The marker shown in FIG. 10(*a*) is a continuous marker strip printed with horizontal black and white stripes (i.e., vertical gradient). When the marker is deployed, the black-and-white printed paper marker strip is posted on the edge of the entrance-exit of the article storage-retrieval cabinet. Afterwards, the angle of view of the camera is adjusted such that the marker strip in the current image of the entrance-exit of the article storage-retrieval cabinet captured by the camera is as parallel as possible to the horizontal axis of the current image. Since the markers are continuous, a column of markers in the image of the detection camera is used as a feature description unit. The line-encoded marker strip as shown in FIG. 10(*a*) is taken as an example. Each column of marker strip has two vertical gradients, one vertical gradient is downward, that is, the gray scale becomes larger from top to bottom, and the other is upward, that is, the gray scale becomes smaller from top to bottom.

Before the process of detecting the store or retrieve operation, an estimated location of each gradient edge may be given manually by drawing a line on the reference image when store or retrieve operation is not performed. In the method according to the embodiment of the present disclosure, the image acquiring unit first acquires the reference image at the moment when store or retrieve operation is not performed, and the storage and retrieval detecting unit searches in the neighborhood of the estimated location in the vertical direction. The pixel location with the largest gradient in the neighborhood is searched and used as an accurate gradient location, and all gradient locations and corresponding gradient directions in each column of markers in the reference image are obtained as the reference marker information.

Afterwards, the image acquiring unit detects the current image of the entrance-exit of the article storage-retrieval cabinet in real time. When a store or retrieve operation has been performed, the gradient is extracted on the current image according to the gradient location in the reference marker information. In the case that no gradient is extracted from the image or the direction of the extracted gradient does not match the features in the reference marker information, then a store or retrieve operation has been performed in the current area, and a marker is blocked. The blocked marker is shown in the shaded area in FIG. 10 (*b*).

Where each marker is recognized in this way, the locations and the number of the blocked areas are obtained. As shown in FIG. 10(*c*), the dotted line portion is the blocked area where a store or retrieve operation has been performed. Two blocked areas are shown in FIG. 10(*b*). Using the information of the blocked area, a store or retrieve signal is output by comparing changes in the number of blocked areas of previous and subsequent frames in a time domain. That is, the store or retrieve signal is output by comparing changes in the number of blocked areas derived from the marker information in the current images acquired at different moments. For the content of the store or retrieve signal, reference may be made to the description following FIG. 9 and step 603, which is not repeated herein.

Figure 11:
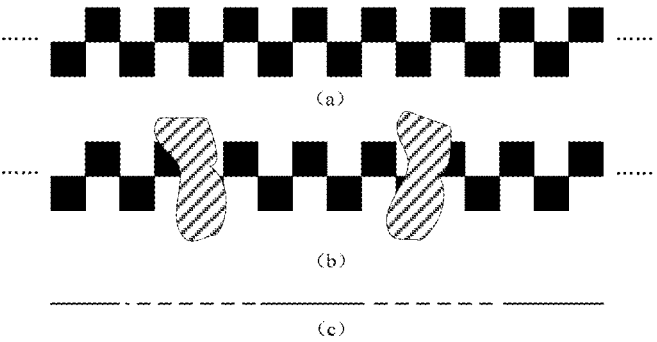
FIG. 11 is a schematic diagram of a process for detecting article store or retrieve operations according to an embodiment of the present disclosure.

Next, the checkerboard marker as shown in FIG. 11(*a*) is taken as an example for description. The checkerboard marker is black and white, and a paper checkerboard marker printed in black and white is posted on the edge of the entrance-exit of the article storage-retrieval cabinet. The marker can be supplemented with light by a light source to reduce illumination changes, thereby reducing the impact on the extraction of checkerboard features. The graphite in the black part of the checkerboard has good light absorption performance, while the printing paper of the white part has good diffuse reflection performance, ensuring that a grayscale difference between black and white in the checkerboard is higher than 100 in a gray scale image.

Before detecting store or retrieve operations, in the method according to the embodiment of the present disclosure, the image acquiring unit first acquires a reference image at the moment when store or retrieve operation is not performed, and then the storage and retrieval detecting unit recognizes all checkerboard corners in the image. As shown in FIG. 11(a), a continuous checkerboard corner sequence exists at the edge of the entrance-exit of the article storage-retrieval cabinet. All checkerboard corner locations are obtained as marker features during the process of detecting the article store or retrieve operation, to obtain reference marker information for subsequent detection.

Afterwards, the image acquiring unit detects the current image of the entrance-exit of the article storage-retrieval cabinet in real time. In the case that a store or retrieve operation has been performed, the store or retrieve operation blocks the checkerboard corners at the edge of the entrance-exit, and the blocked checkerboard corners are as shown in the shaded area in FIG. 11(b). The checkerboard corners are extracted from the current image based on the locations of the checkerboard corners derived from the reference marker information. In the case that a checkerboard corner can be extracted in the current image, the extracted checkerboard corner matches the location of the checkerboard corner, and the checkerboard corner at that location is not blocked. In the case that no checkerboard corner can be extracted in the current image, the checkerboard corner at that location is blocked, and it is determined that a store or retrieve operation has been performed.

Where each checkerboard is recognized in this way, the locations and the number of the blocked areas are obtained. As shown in FIG. 11(c), the dotted line portion is a blocked area where a store or retrieve operation has been performed. Two blocked areas are shown in the figure. Using the information of the blocked area, a store or retrieve signal is output by comparing changes in the number of blocked areas of previous and subsequent frames in the time domain. That is, the store or retrieve signal is output by comparing the changes in the number of blocked areas derived from the marker information in the current image acquired at different moments. For the content of the store or retrieve signal, reference may be made to the above description, which is not repeated herein.

Figure 12:
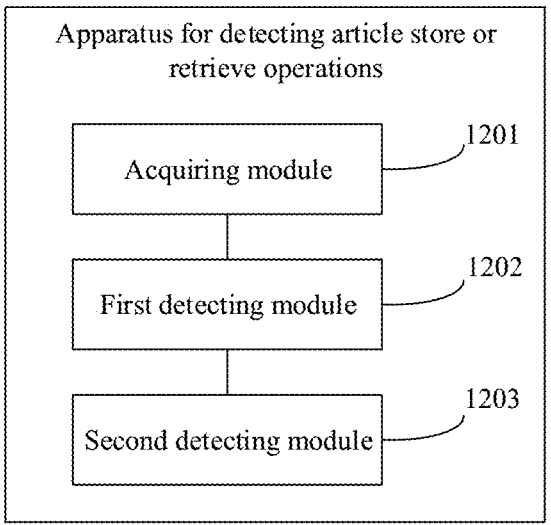
FIG. 12 is a schematic structural diagram of an apparatus for detecting article store or retrieve operations according to an embodiment of the present disclosure.

An embodiment of the present disclosure provides an apparatus for detecting article storage and retrieval, which is applicable to the system for detecting an article store or retrieve operation. Based on a plurality of modules shown in FIG. 12, the apparatus for detecting an article store or retrieve operation shown in FIG. 12 can realize the method for detecting an article store or retrieve operation. Referring to FIG. 12, the apparatus includes:

an acquiring module 1201, configured to acquire a current image of an entrance-exit of an article storage-retrieval cabinet;

a first detecting module 1202, configured to detect marker information in the current image; and a second detecting module 1203, configured to detect an article store or retrieve operation based on a detection result.

In some embodiments, the second detecting module 1203 is configured to, in response to the detection result indicating that the marker information is detected, match the detected marker information with reference marker information, the reference marker information including marker information in the case that the marker at the edge of the entrance-exit of the article storage-retrieval cabinet is not blocked; and detect an article store or retrieve operation based on a matching result.

In some embodiments, the marker information is configured to indicate a location and feature of the marker.

The second detecting module 1203 is configured to, in response to the location and feature of the marker indicated by the detected marker information matching the location and feature of the marker indicated by the reference marker information respectively, determine that no article store or retrieve operation has been performed; and in response to the location and feature of the marker indicated by the detected marker information not matching the location and feature of the marker indicated by the reference marker information respectively, determine that an article store or retrieve operation has been performed.

In some embodiments, the second detecting module 1203 is configured to, in response to the detection result indicating that no marker information is detected, determine that an article store or retrieve operation has been performed.

Figure 13:
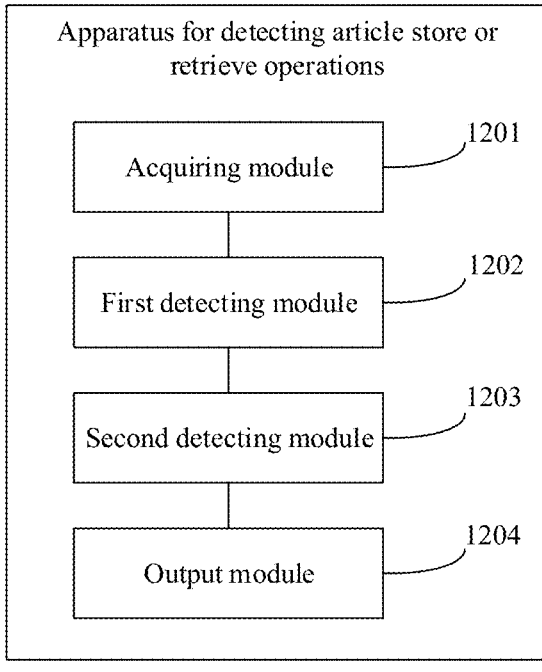
FIG. 13 is a schematic structural diagram of an apparatus for detecting article store or retrieve operations according to an embodiment of the present disclosure.

In some embodiments, referring to FIG. 13, the apparatus further includes:

an output module 1204, configured to, in response to determining that the article store or retrieve operation has been performed, determine an area where the marker is blocked, and output a store or retrieve signal based on a change in the area where the marker is blocked, the store or retrieve signal being configured to indicate a state of the article store or retrieve operation.

The acquiring module 1201 configured to acquire the current image may be implemented by the image acquiring unit 12 shown in FIGS. 1, 3, and 5. The functions of the acquiring module 1201, the first detecting module 1202, and the second detecting module 1203 may be implemented by the storage and retrieval detecting unit 13 shown in FIGS. 1, 3, and 5.

It should be noted that, where the apparatus according to the above embodiment implements its functions, only the division of the functional modules is used as an example. In actual applications, the functions may be implemented by different functional modules according to actual needs, that is, the internal structure of the device is divided into different functional modules to complete all or part of the functions described above. In addition, the apparatus and method according to the above embodiments belong to the same concept, and the specific implementation process is detailed in the method embodiments, which is not repeated herein.

Figure 14:
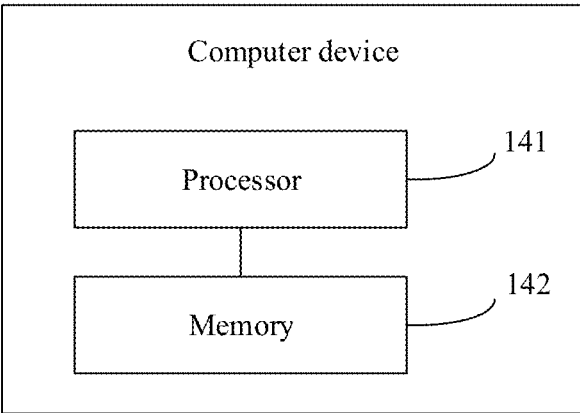
FIG. 14 is a schematic structural diagram of a computer device according to an embodiment of the present disclosure.

An exemplary embodiment provides a computer device. Referring to FIG. 14, the computer device includes a processor 141 and a memory 142. The memory 142 stores at least one instruction. The at least one instruction is configured to be executed by one or more processors 141, so as to implement any one of the methods for detecting an article store or retrieve operation.

Figure 15:
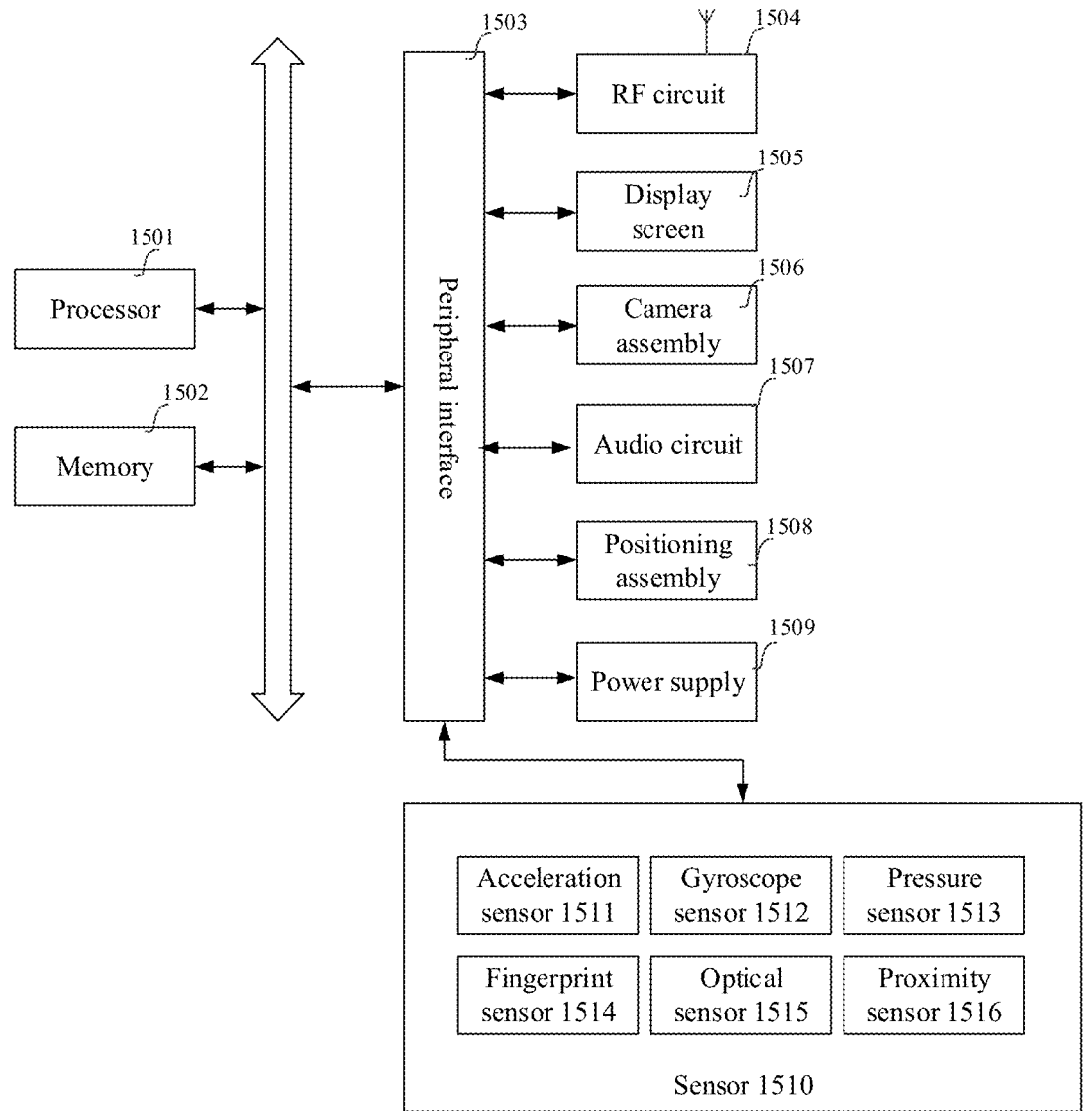
FIG. 15 is a schematic structural diagram of a computer device according to an embodiment of the present disclosure.

FIG. 15 is a schematic structural diagram of a computer device according to an embodiment of the present disclosure. The device may be a terminal, such as a smart phone, a tablet computer, a Moving Picture Experts Group Audio Layer III (MP3) player, a Moving Picture Experts Group Audio Layer IV (MP4) player, a laptop or a desktop computer. The terminal may also be known as user equipment, portable terminal, laptop terminal, desktop terminal, or the like.

Generally, the terminal includes a processor 1501 and a memory 1502.

The processor 1501 may include one or more processing cores, such as a 4-core processor, an 8-core processor, and the like. The processor 1501 may be implemented by at least one hardware form of a digital signal processor (DSP), field-programmable gate array (FPGA), and programmable logic array (PLA). The processor 1501 may further include a main processor and a coprocessor. The main processor is a processor configured to process data in an awake state, also known as a central processing unit (CPU). The coprocessor is a low-power-consumption processor configured to process data in a standby state. In some embodiments, the processor 1501 may be integrated with a graphics processing unit (GPU) responsible for rendering and drawing a content that needs to be displayed on a display screen. In some embodiments, the processor 1501 may further include an Artificial Intelligence (AI) processor, and the AI processor is configured to process calculation operations related to machine learning.

The memory 1502 may include one or more computer-readable storage media, which may be non-transitory. The memory 1502 may further include a high-speed random access memory and a non-volatile memory, such as one or more magnetic disk storage devices and flash memory storage devices. In some embodiments, the non-transitory computer-readable storage medium in the memory 1502 is configured to store at least one instruction, and the at least one instruction is configured to be executed by the processor 1501 to implement the method for detecting an article store or retrieve operation according to the method embodiment of the present disclosure.

In some embodiments, the terminal may optionally further include: a peripheral device interface 1503 and at least one peripheral device. The processor 1501, the memory 1502, and the peripheral device interface 1503 may be connected via buses or signal lines. Each peripheral device may be connected to the peripheral device interface 1503 via a bus, a signal line, or a circuit board. Specifically, the peripheral device includes at least one of a radio frequency circuit 1504, a touch screen 1505, a camera 1506, an audio circuit 1507, a positioning assembly 1508, and a power supply 1509.

The peripheral device interface 1503 may be configured to connect at least one peripheral device related to input/output (I/O) to the processor 1501 and the memory 1502. In some embodiments, the processor 1501, the memory 1502, and the peripheral device interface 1503 are integrated on the same chip or circuit board. In some other embodiments, any one or two of the processors 1501, the memory 1502, and the peripheral device interface 1503 may be implemented on a separate chip or circuit board, which is not limited in this embodiment.

The Radio-Frequency circuit 1504 is configured to receive and transmit radio frequency (RF) signals which are also known as electromagnetic signals. The RF circuit 1504 communicates with a communication network and other communication devices by electromagnetic signals. The RF circuit 1504 converts electrical signals into electromagnetic signals for transmission, or converts received electromagnetic signals into electrical signals. Optionally, the RF circuit 1504 includes: an antenna system, an RF transceiver, one or more amplifiers, a tuner, an oscillator, a digital signal processor, a codec chipset, a user identity module card, and the like. The RF circuit 1504 may communicate with other terminals via at least one wireless communication protocol. The wireless communication protocol includes, but is not limited to: metropolitan area networks, various generations of mobile communication networks (2G, 3G, 4G, and 5G), wireless local area networks and/or wireless fidelity (Wi-Fi) networks. In some embodiments, the RF circuit 1504 may further include a circuit related to near-field communication (NFC), which is not limited in the present disclosure.

The display screen 1505 is configured to display a user interface (UI). The UI may include graphics, text, icons, videos, and any combination thereof. When the display screen 1505 is a touch screen, the display screen 1505 also has the ability to acquire touch signals on or above the surface of the display screen 1505. The touch signal may be input to the processor 1501 as a control signal for processing. In this case, the display screen 1505 may also be configured to provide virtual buttons and/or virtual keyboards, also known as soft buttons and/or soft keyboards. In some embodiments, one display screen 1505 may be provided on a front panel of the terminal. In other embodiments, at least two display screens 1505 may be respectively provided on different surfaces of the terminal or in a folding design. In an embodiment, the display screen 1505 may be a flexible display screen, which is arranged on a curved surface or a folding surface of the terminal. Furthermore, the display screen 1505 may also be provided as a non-rectangular irregular pattern, that is, a special-shaped screen. The display screen 1505 may be a liquid crystal display (LCD), an organic light-emitting diode (OLED) display, and the like.

The camera assembly 1506 is configured to acquire images or videos. Optionally, the camera assembly 1506 includes a front camera and a rear camera. Generally, the front camera is provided on the front panel of the terminal, and the rear camera is provided on the back of the terminal. In some embodiments, at least two rear cameras are provided, each of which is a main camera, a depth-of-field camera, a wide-angle camera, and a telephoto camera, so as to realize a bokeh effect by fusing the main the main camera and the depth-of-field camera, to achieve panoramic shooting and virtual reality (VR) shooting function by fusing the main camera and the wide-angle camera, and other fusion-based shooting effect. In some embodiments, the camera assembly 1506 may further include a flashlight. The flashlight may be a single-color flash or a dual-color flash. Dual color temperature flash refers to a combination of warm light flashlight and cold light flashlight, which may be used for light compensation under different color temperatures.

The audio circuit 1507 may include a microphone and a speaker. The microphone is configured to acquire sound waves of a user and environment, and convert the sound waves into an electrical signal, which is input to the processor 1501 to be processed, or input to the RF circuit 1504 to implement voice communication. For the purpose of stereo collection or noise reduction, a plurality of microphones may be provided, which are respectively provided in different parts of the terminal. The microphone may also be an array microphone or an omnidirectional collection microphone. The speaker is configured to convert the electrical signal from the processor 1501 or the RF circuit 1504 into sound waves. The speaker may be a traditional thin-film speaker or a piezoelectric ceramic speaker. The speaker in the case of the piezoelectric ceramic speaker, it can not only convert the electrical signal into sound waves that are audible to humans, but also convert the electrical signal into sound waves that are inaudible to humans for distance measurement and other purposes. In some embodiments, the audio circuit 1507 may further include a headphone jack.

The positioning assembly 1508 is configured to position a current geographic location of the electronic device to implement navigation or a location-based service (LBS).

The positioning assembly 1508 may be the United States' Global Positioning System (GPS), Russia's Global Navigation Satellite System (GLONASS), China's BeiDou Navigation Satellite System (BDS), and the European Union's Galileo Satellite Navigation System (Galileo).

The power supply 1509 is configured to supply power to various assemblies in the terminal. The power supply 1509 may be alternating current, direct current, disposable batteries, or rechargeable batteries. When the power supply 1509 includes a rechargeable battery, the rechargeable battery may support wired charging or wireless charging. The rechargeable battery may also be configured to support quick charge technology.

In some embodiments, the terminal further includes one or more sensors 1510. The one or more sensors 1510 include, but are not limited to, an acceleration sensor 1511, a gyroscope sensor 1512, a pressure sensor 1513, a fingerprint sensor 1514, an optical sensor 1515, and a proximity sensor 1516.

The acceleration sensor 1511 may be configured to detect the magnitude of acceleration on three coordinate axes of a coordinate system established by the terminal. For example, the acceleration sensor 1511 may detect the components of gravitational acceleration on the three coordinate axes. The processor 1501 may control the touch screen 1505 to display the user interface in a horizontal view or a vertical view according to the gravity acceleration signal acquired by the acceleration sensor 1511. The acceleration sensor 1511 may also be used for the collection of game or user motion data.

The gyroscope sensor 1512 may be configured to detect a body direction and rotation angle of the terminal, and the gyroscope sensor 1512 may cooperate with the acceleration sensor 1511 to acquire the user's 3D motion on the terminal. The processor 1501 may implement the following functions according to the data acquired by the gyroscope sensor 1512: motion sensing (e.g., changing the UI according to the user's tilt operation), image stabilization during shooting, game control, and inertial navigation.

The pressure sensor 1513 may be disposed on a side frame of the terminal and/or a lower layer of the touch display screen 1505. In the case that the pressure sensor 1513 is arranged on the side frame of the terminal, the user's holding signal of the terminal may be detected, and the processor 1501 performs left and right hand recognition or quick operation according to the holding signal acquired by the pressure sensor 1513. In the case that the pressure sensor 1513 is disposed at the lower layer of the touch display screen 1505, the processor 1501 controls operability controls on the UI interface according to the user's pressure operation on the touch display screen 1505. The operability controls include at least one of a button control, a scroll bar control, an icon control, and a menu control.

The fingerprint sensor 1514 is configured to acquire the user's fingerprint. The processor 1501 recognizes the user's identity according to the fingerprint acquired by the fingerprint sensor 1514, or the fingerprint sensor 1514 recognizes the user's identity according to the acquired fingerprint. When the user's identity is recognized as a trusted identity, the processor 1501 authorizes the user to perform related sensitive operations, including unlocking the screen, viewing encrypted information, downloading software, paying, and changing settings. The fingerprint sensor 1514 may be disposed on the front, back or side of the terminal. When a physical button or a manufacturer logo is provided on the terminal, the fingerprint sensor 1514 may be integrated with the physical button or the manufacturer logo.

The optical sensor 1515 is configured to acquire ambient light intensity. In an embodiment, the processor 1501 may control the display brightness of the touch display screen 1505 according to the ambient light intensity acquired by the optical sensor 1515. Specifically, when the ambient light intensity is high, the display brightness of the touch display screen 1505 is increased. When the ambient light intensity is low, the display brightness of the touch display screen 1505 is decreased. In another embodiment, the processor 1501 may also dynamically adjust shooting parameters of the camera assembly 1506 according to the ambient light intensity acquired by the optical sensor 1515.

The proximity sensor 1516, also known as distance sensor, is usually disposed on the front panel of the terminal. The proximity sensor 1516 is configured to acquire a distance between the user and the front of the terminal. In one embodiment, when the proximity sensor 1516 detects that the distance between the user and the front of the terminal gradually decreases, the processor 1501 controls the touch display screen 1505 to switch from an on-screen state to an off-screen state. When the proximity sensor 1516 detects that the distance between the user and the front of the terminal gradually increases, the processor 1501 controls the touch display screen 1505 to switch from the off-screen state to the on-screen state.

Those skilled in the art can understand that the structure shown in FIG. 15 does not constitute a limitation on the terminal, and may include more or less assemblies than shown in the figure, or combine certain assemblies, or adopt different assembly arrangements.

In an exemplary embodiment, a computer-readable storage medium is also provided. The storage medium stores at least one instruction. The at least one instruction, when executed by a processor of a computer device, realizes any one of the methods for detecting an article store or retrieve operation.

In possible implementations of the present disclosure, the computer-readable storage medium may be a read-only memory (ROM), a random-access memory (RAM), a compact disc read-only memory (CD-ROM), a magnetic tape, a floppy disk, an optical data storage device, or the like.

It should be understood that the term "a plurality of" mentioned herein refers to two or more, and the term "and/or" describes an association relationship of associated articles, indicating three relationships. For example, A and/or B means: A alone exists, A and B exist at the same time, and B exists alone. The symbol "|" generally indicates that the associated articles before and following "|" are in an "or" relationship.

The serial numbers of the above embodiments of the present disclosure are only for description, and do not represent the advantages and disadvantages of the embodiments.

Described above are merely exemplary embodiments of the present disclosure, and are not intended to limit the present disclosure. Within the spirit and principles of the present disclosure, any modifications, equivalent substitutions, improvements, and the like are within the protection scope of the present disclosure.

What is claimed is:

1. A system for detecting article store or retrieve operations, comprising: an article storage-retrieval cabinet, an image acquiring unit, and a storage or retrieval detecting unit; wherein an edge of an entrance-exit of the article storage-retrieval cabinet is provided with a plurality of markers arranged continuously for a circle, and the image acquiring unit is configured to acquire an image of the entrance-exit of the article storage-retrieval cabinet; and the storage or retrieval detecting unit is connected to the image acquiring unit, and is configured to detect an article store or retrieve operation based on marker information in the image acquired by the image acquiring unit, wherein the storage or retrieval detecting unit is furthered configured to:

determine an area where a marker among the plurality of markers arranged continuously for a circle is blocked, and output a store or retrieve signal based on a change in the area where the marker is blocked, the store or retrieve signal being configured to indicate a state of the article store or retrieve operation, wherein the store or retrieve signal includes an entry signal and an exit signal, the entry signal is triggered in response to a number of blocked areas being increased, and the entry signal is configured to indicate an article to enter the article storage-retrieval cabinet, wherein the exit signal is triggered in response to the number of blocked areas being decreased, and the exit signal is configured to indicate the article to exit the article storage-retrieval cabinet, the image acquiring unit is provided at an upper right corner of the entrance-exit, wherein the store or retrieve signal further includes a start state signal and an end state signal of a store and retrieve process, wherein the start state signal is triggered in response to the number of the blocked areas changing from 0 to 1, and the start state signal is configured to indicate a start of entering the article storage-retrieval cabinet; the end state signal is triggered in response to the number of the blocked areas changing from 1 to 0, and the end state signal is configured to indicate to completely exit the article storage-retrieval cabinet, and wherein the image acquiring unit is provided at an upper right corner of the entrance-exit, wherein the plurality of markers form a feature array, and an interval between every two markers is less than a width of a smallest article of articles retrieved from or stored into the article storage and retrieval cabinet.

2. The system according to claim 1, wherein the marker comprises one or more of a line feature marker, a barcode marker, and a checkerboard marker.

3. The system according to claim 1, wherein the image acquiring unit comprises one camera, wherein a monitoring area of the camera covers the entire entrance-exit of the article storage-retrieval cabinet.

4. The system according to claim 1, wherein the image acquiring unit comprises a plurality of cameras, wherein a monitoring area of each of the plurality of cameras covers a part of the entrance-exit of the article storage-retrieval cabinet, and the monitoring areas of the plurality of cameras cover the entire entrance-exit of the article storage-retrieval cabinet.

5. The system according to claim 1, further comprising a light source for supplementing light to the marker.

6. The system according to claim 1, wherein one side of the edge of the marker is made of a light-absorbing material, and the other side is made of a diffuse reflection material.

7. The system according to claim 1, wherein a difference between pixel values or pixel gray values of areas on both sides of the edge of the marker in the image acquired by the image acquiring unit is greater than 10.

8. A method for detecting article store or retrieve operations, applicable to an article storage-retrieval cabinet and comprising:

acquiring, by an image acquiring unit, a current image of an entrance-exit of the article storage-retrieval cabinet;

detecting, by the image acquiring unit, marker information in the current image, wherein an edge of the entrance-exit of the article storage-retrieval cabinet is provided with a plurality of markers arranged continuously for a circle; and detecting, by a storage or retrieval detecting unit, an article store or retrieve operation based on a detection result, wherein in response to determining that the article store or retrieve operation has been performed, the method further comprises:

determining, by the storage or retrieval detecting unit, an area where a marker among the plurality of markers arranged continuously for a circle is blocked, and outputting, by the storage or retrieval detecting unit, a store or retrieve signal based on a change in the area where the marker is blocked, the store or retrieve signal being configured to indicate a state of the article store or retrieve operation, wherein the store or retrieve signal includes an entry signal and an exit signal, the entry signal is triggered in response to a number of blocked areas being increased, and the entry signal is configured to indicate an article to enter the article storage-retrieval cabinet, wherein the exit signal is triggered in response to the number of blocked areas being decreased, and the exit signal is configured to indicate the article to exit the article storage-retrieval cabinet, wherein the store or retrieve signal further includes a start state signal and an end state signal of a store and retrieve process, wherein the start state signal is triggered in response to the number of the blocked areas changing from 0 to 1, and the start state signal is configured to indicate a start of entering the article storage-retrieval cabinet; the end state signal is triggered in response to the number of the blocked areas changing from 1 to 0, and the end state signal is configured to indicate to completely exit the article storage-retrieval cabinet, and wherein the image acquiring unit is provided at an upper right corner of the entrance-exit, wherein the plurality of markers form a feature array, and an interval between every two markers is less than a width of a smallest article of articles retrieved from or stored into the article storage and retrieval cabinet.

9. The method according to claim 8, wherein detecting the article store or retrieve operation based on the detection result comprises:

in response to the detection result indicating that the marker information is detected, matching the detected marker information with reference marker information, the reference marker information comprising marker information in the case that the marker at the edge of the entrance-exit of the article storage-retrieval cabinet is not blocked; and detecting the article store or retrieve operation based on a matching result.

10. The method according to claim 9, wherein the marker information is configured to indicate a location and feature of the marker; and detecting the article store or retrieve operation based on the matching result comprises:

in response to the location and feature of the marker indicated by the detected marker information matching the location and feature of the marker indicated by the reference marker information respectively, determining that article store or retrieve operation has not been performed; or in response to the location and feature of the marker indicated by the detected marker information not matching the location and feature of the marker indicated by the reference marker information respectively, determining that the article store or retrieve operation has been performed.

11. The method according to claim 8, wherein detecting the article store or retrieve operation based on the detection result comprises:

in response to the detection result indicating that no marker information is detected, determining that an article store or retrieve operation has been performed.

12. A non-transitory computer-readable storage medium storing at least one instruction, wherein the at least one instruction, when loaded and executed by a processor of an electronic device, causes the electronic device to perform the method for detecting article store or retrieve operations as defined in claim 8.

13. A computer device, comprising:

a processor and a memory; wherein the memory is configured to store at least one instruction executable by the processor; and the processor, when loading and executing the at least one instruction, is caused to perform a method for detecting article storage and retrieval, applicable to an article storage-retrieval cabinet and comprising:

acquiring a current image of an entrance-exit of the article storage-retrieval cabinet;

detecting marker information in the current image, wherein an edge of the entrance-exit of the article storage-retrieval cabinet is provided with a plurality of markers arranged continuously for a circle; and detecting an article store or retrieve operation based on a detection result, wherein in response to determining that the article store or retrieve operation has been performed, the method further comprises:

determining an area where a marker among the plurality of markers arranged continuously for a circle is blocked, and outputting a store or retrieve signal based on a change in the area where the marker is blocked, the store or retrieve signal being configured to indicate a state of the article store or retrieve operation, wherein the store or retrieve signal includes an entry signal and an exit signal, the entry signal is triggered in response to a number of blocked areas being increased, and the entry signal is configured to indicate an article to enter the article storage-retrieval cabinet, wherein the exit signal is triggered in response to the number of blocked areas being decreased, and the exit signal is configured to indicate the article to exit the article storage-retrieval cabinet, wherein the store or retrieve signal further includes a start state signal and an end state signal of a store and retrieve process, wherein the start state signal is triggered in response to the number of the blocked areas changing from 0 to 1, and the start state signal is configured to indicate a start of entering the article storage-retrieval cabinet; the end state signal is triggered in response to the number of the blocked areas changing from 1 to 0, and the end state signal is configured to indicate to completely exit the article storage-retrieval cabinet, and wherein the current image of an entrance-exit of the article storage-retrieval cabinet is acquired by an image acquiring unit provided at an upper right corner of the entrance-exit, wherein the plurality of markers form a feature array, and an interval between every two markers is less than a width of a smallest article of articles retrieved from or stored into the article storage and retrieval cabinet.

14. The computer device according to claim 13, wherein detecting the article store or retrieve operation based on the detection result comprises:

in response to the detection result indicating that the marker information is detected, matching the detected marker information with reference marker information, the reference marker information comprising marker information in the case that the marker at the edge of the entrance-exit of the article storage-retrieval cabinet is not blocked; and detecting the article store or retrieve operation based on a matching result.

15. The computer device according to claim 14, wherein the marker information is configured to indicate a location and feature of the marker; and detecting the article store or retrieve operation based on the matching result comprises:

in response to the location and feature of the marker indicated by the detected marker information matching the location and feature of the marker indicated by the reference marker information respectively, determining that article store or retrieve operation has not been performed; or in response to the location and feature of the marker indicated by the detected marker information not matching the location and feature of the marker indicated by the reference marker information respectively, determining that the article store or retrieve operation has been performed.

16. The computer device according to claim 13, wherein detecting the article store or retrieve operation based on the detection result comprises:

in response to the detection result indicating that no marker information is detected, determining that an article store or retrieve operation has been performed.

17. The system according to claim 5, wherein the light source is arranged directly opposite to the article storage-retrieval cabinet to face the edge of the entrance-exit of the article storage-retrieval cabinet, and the system further comprises a control device control turning on and off of the light source based on brightness of the environment where the article storage-retrieval cabinet is located.

18. The system according to claim 6, wherein the light-absorbing material comprises light-absorbing photographic cloth, printing ink and rubber, and the diffuse reflection material comprises printing paper and polyethylene terephthalate (PET).

* * * * *